US011681556B2

(12) United States Patent
Tomic et al.

(10) Patent No.: US 11,681,556 B2
(45) Date of Patent: Jun. 20, 2023

(54) COMPUTING SYSTEM PERFORMANCE ADJUSTMENT VIA TEMPORARY AND PERMANENT RESOURCE ALLOCATIONS

(71) Applicant: International Business Machines Corporation, Armonk, NY (US)

(72) Inventors: Sasa Tomic, Kilchberg (CH); Zoltan Arnold Nagy, Zurich (CH); Niels Dominic Pardon, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 16/821,171

(22) Filed: Mar. 17, 2020

(65) Prior Publication Data

US 2021/0294656 A1    Sep. 23, 2021

(51) Int. Cl.
  *G06F 9/50*    (2006.01)
  *G06F 11/34*   (2006.01)
  *G06F 11/30*   (2006.01)

(52) U.S. Cl.
  CPC ............ *G06F 9/5027* (2013.01); *G06F 9/50* (2013.01); *G06F 11/3006* (2013.01);
  (Continued)

(58) Field of Classification Search
  CPC .... G06F 9/5027; G06F 9/546; G06F 11/3006; G06F 11/3414; G06F 9/50; G06F 2209/501; G06F 2209/508
  See application file for complete search history.

(56) References Cited

U.S. PATENT DOCUMENTS

| 7,463,648 B1* | 12/2008 | Eppstein ............... G06F 9/5011 709/227 |
| 9,531,607 B1* | 12/2016 | Pai ...................... H04L 41/5051 |

(Continued)

FOREIGN PATENT DOCUMENTS

| CN | 103649920 A | 3/2014 |
| CN | 110442449 A | 11/2019 |

(Continued)

OTHER PUBLICATIONS

International Search Report and Written Opinion, International Application No. PCT/IB2021/050368, International Filing Date Jan. 19, 2021.

(Continued)

*Primary Examiner* — Benjamin C Wu
(74) *Attorney, Agent, or Firm* — Gilbert Harmon, Jr.

(57) ABSTRACT

The invention relates to a method for adjusting a performance of a computing system, the method comprising receiving by the computing system at least one command to execute a computational workload from a client, applying by the computing system an identification method identifying a first system resource of the system resources which limits an execution performance of the computational workload, performing a temporary adjustment of an allocation of the first system resource to the client and evaluating whether this improves an execution performance of the computational workload, and, if this is the case, offering to the client to permanently adjust the allocation of the first system resource to the client and adjusting the allocation of the first system resource to the client permanently in case of receiving a corresponding instruction from the client. The invention also relates to a computing system and a computer program product which implement the method.

19 Claims, 6 Drawing Sheets

(52) U.S. Cl.
CPC .... *G06F 11/3414* (2013.01); *G06F 2209/501* (2013.01); *G06F 2209/508* (2013.01)

(56) References Cited

U.S. PATENT DOCUMENTS

| | | | | |
|---|---|---|---|---|
| 2011/0145392 | A1* | 6/2011 | Dawson | H04L 47/783 709/224 |
| 2014/0068053 | A1 | 3/2014 | Ravi | |
| 2015/0052081 | A1* | 2/2015 | Duron | G06Q 50/184 705/418 |
| 2015/0207752 | A1* | 7/2015 | Birkestrand | H04L 67/1008 709/226 |
| 2015/0365309 | A1 | 12/2015 | Kaminski | |
| 2017/0046206 | A1 | 2/2017 | Kofkin-Hansen | |
| 2017/0116038 | A1* | 4/2017 | Netto | G06F 9/5077 |
| 2019/0250949 | A1 | 8/2019 | Chen | |
| 2022/0405133 | A1* | 12/2022 | Kalmuk | G06F 9/505 |

FOREIGN PATENT DOCUMENTS

| | | |
|---|---|---|
| JP | 2016024697 A | 2/2016 |
| WO | 2021186253 A1 | 9/2021 |

OTHER PUBLICATIONS

Ilyushkin et al., "Performance-Feedback Autoscaling with Budget Constraints for Cloud-based Workloads of Workflows", arXiv:1905.10270v2 [cs.DC], Jul. 23, 2019, 28 pages, <https://arxiv.org/pdf/1905.10270.pdf>.

Mell et al., "The NIST Definition of Cloud Computing", Recommendations of the National Institute of Standards and Technology, NIST Special Publication 800-145, Sep. 2011, 7 pages.

Sujaudeen et al., "TARNN: Task-Aware Autonomic Resource Management Using Neural Networks in Cloud Environment", Concurrency and Computation Practice and Experience, Special Issue Paper, Revised: May 28, 2019 Accepted: Jun. 28, 2019, DOI: 10.1002/cpe.5463, Wiley, 18 pages, <https://onlinelibrary.wiley.com/doi/full/10.1002/cpe.5463>.

* cited by examiner

COMPUTING SYSTEM PERFORMANCE ADJUSTMENT VIA TEMPORARY AND PERMANENT RESOURCE ALLOCATIONS

FIELD OF THE INVENTION

The field of the invention relates generally to adjusting the performance of a computing system, and more specifically, to minimizing the amount of unused resources allocated in a cloud-based services system.

BACKGROUND

Computing systems may perform calculations as a service. For instance, a computing system connected to the world wide web may accept an order to perform a computational workload and then perform said computation workload. A computing system may be made up of multiple networked computing devices. In some instances, such computing systems may be referenced to as cloud computing systems.

The performance of a computing system is dependent on the types of resources it employs. For instance, the performance of a computing system may be affected by its CPU, by its GPU or by other accelerator resources, by its memory resources, and by its network resources. Some computing systems allow for dynamically swapping the system resources which are designated to the execution of a certain task.

Cloud services are sometimes sized and corresponding sold based on meeting an estimated peak resource requirement. In most computational circumstances the peak resource requirements are not required, resulting in inefficient use of resources by the cloud service provider and elevated costs for the cloud service consumer. Improved use of computational resources could be made by both the cloud service provider and consumer if the allocated cloud service resources could more closely map to the cloud service consumer computational requirements.

SUMMARY

Various embodiments provide a method for adjusting a performance of a computing system. Further embodiments provide a computing system, the computing system being configured to implement the aforementioned method. In addition, embodiments of a computer program product are provided which causes a computing system to function according to the aforementioned method. Advantageous embodiments are described in the dependent claims. Embodiments of the present invention can be freely combined with each other if they are not mutually exclusive.

Various embodiments provide a method for adjusting a performance of a computing system, comprising:

receiving by the computing system at least one command to execute a computational workload from a client;

allocating system resources of the computing system to the client by the computing system and executing the computational workload by the computing system;

applying by the computing system an identification method, the identification method identifying a first system resource of the system resources which limits an execution performance of the computational workload;

performing by the computing system a temporary adjustment of an allocation of the first system resource to the client;

evaluating by the computing system whether the temporary adjustment of the allocation of the first system resource to the client improves an execution performance of the computational workload;

if the temporary adjustment of the allocation of the first system resource to the client improves the execution performance of the computational workload, transmitting by the computing system to the client a message indicating that the allocation of the first system resource to the client can be permanently adjusted; and in case of receiving by the computing system from the client an instruction to perform a permanent adjustment of the allocation of the first system resource to the client, performing by the computing system the permanent adjustment of the allocation of the first system resource to the client.

In another aspect, the invention relates to a computing system, the computing system being configured to implement the method described above. In another aspect, the invention relates to a computer program product for operating a computing system, the computer program product comprising a computer readable storage medium having program instructions embodied therewith, the program instructions executable by a processor to cause the computing system to function according to the method described above.

BRIEF DESCRIPTION OF THE DRAWINGS

In the following, embodiments are explained in greater detail, by way of example only, making reference to the drawings in which.

DETAILED DESCRIPTION

Figure 1:
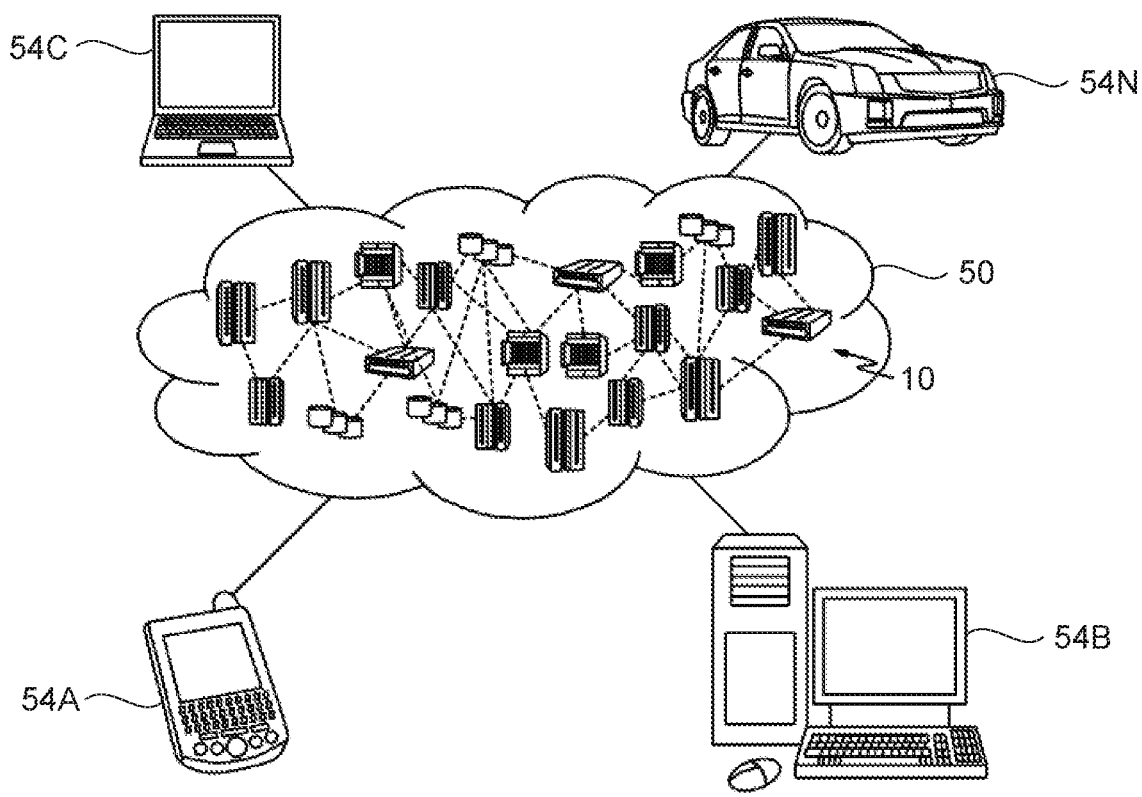
FIG. 1 depicts a cloud computing environment.

The descriptions of the various embodiments of the present invention are being presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Cloud infrastructure removes a lot of burden from the IT departments of companies. They no longer need to build datacenters, maintain servers, network, storage as well as supporting infrastructure like cooling and electricity but can delegate this to a cloud service provider. However, some companies rely on large and expensive instances and packages of cloud services, since their business goals cannot be achieved with an adequate performance if they use smaller, cheaper configurations. Therefore, some companies have significant expenses with regard to cloud services. Typically, a large part of rented cloud services are unused most of the time, since companies rarely rent cloud services based on actual data or actual computational workloads that they perform, but typically rent the cloud services based on estimated peak resource requirements.

Given this context, more and more cloud infrastructure providers offer so-called serverless, lambda or function-as-a-service offerings for which users no longer need to submit a request for infrastructure resources on which they can run their applications. Instead, they can simply submit individual functions making up their application and thus can delegate the scaling and scheduling of infrastructure resources needed to execute those functions to the cloud service provider. For such serverless offerings, an end user would typically provide a function to be executed together with some information about the resource requirements. It would be preferable both for users and cloud service providers if the amount of unused resources were minimized and more closely related to business benefits that can be realized by running a certain computational workload.

In one aspect, the invention relates to a method for adjusting a performance of a computing system. According to embodiments, the computing system may be a PC, a group of PCs, a server system connected to the world wide web, a group of servers, or a cloud computing system. The method comprises receiving by the computing system at least one command to execute a computational workload from a client. A workload may comprise a computational task or multiple computational subtasks to be executed by the computing system. For instance, a computational task or subtask may comprise performing computations, analyzing and storing data, serving web pages or providing database functionality. Subtasks of a computational workload may be completed within a continuous period or within separate periods of time. According to an embodiment, the computational workload is submitted as an individual function by the client to the computing system.

According to an embodiment, the computing system may receive a request for system resources from the client ahead of receiving the command to execute the computational workload. By means of the request for the system resources, the client may specify which system resources the computing system shall make available for executing the computational workload. Depending on which system resources are chosen by the client, a task may execute more or less quickly.

The method further comprises allocating system resources of the computing system to the client by the computing system and executing the computational workload by the computing system. According to embodiments, system resources may be allocated to the client according to a specification submitted by the client or by the computing system itself. System resources allocated to the client can be used by the computing system to execute the computational workload which has been commissioned by the client. The computing system may subsequently apply an identification method which identifies a first system resource of the system resources which limits an execution performance of the computational workload. Thus, the computing system may identify a bottleneck which prevents the computational workload from executing more quickly, more efficiently, or more economically. The computing system then performs a temporary adjustment of an allocation of the first system resource to the client. According to embodiments, this may comprise exchanging a system component that provides the first system resource with another system component. For instance, a different CPU may be assigned to a client. According to other embodiments, the adjustment may comprise adjusting a quantity of the first system resource, for instance an amount of memory. According to some embodiments, the temporary adjustment may be temporary in the sense that it is reverted after a predetermined amount of time, or in that it is reverted under certain circumstances, for instance if resources of the computing system are required for other tasks.

The method further comprises evaluating by the computing system whether the temporary adjustment of the allocation of the first system resource to the client improves an execution performance of the computational workload. According to embodiments, this may be accomplished by monitoring whether the computational workload or portions of the computational workload execute more quickly when the allocation of the first system resource has been adjusted. If the temporary adjustment of the allocation of the first system resource to the client improves the execution performance of the computational workload, the computing system transmits to the client a message indicating that the allocation of the first system resource to the client can be permanently adjusted. According to embodiments, said message may be a system call, a network message, an e-mail, a text message displayed within an administrative interface of the computing system, or any other type of message.

In case of receiving by the computing system from the client an instruction to perform a permanent adjustment of the allocation of the first system resource to the client, the computing system performs the permanent adjustment of the allocation of the first system resource to the client. According to an embodiment, said instruction is received by the computing system via an administrative interface of the computing system. According to some embodiments, it is possible that an allocation of at least one additional system resource to the client is changed when the allocation of the first system resource to the client is changed. The presented method may have the advantage that it allows to identify and to remove bottlenecks so that the computational workload can be executed more quickly.

According to one embodiment, the computing system features at least one service gateway configured to communicate with the client. According to an embodiment, the service gateway is a web server. According to an embodiment, the computing system features a resource allocator which allows to allocate resources to the client. It is possible according to some embodiments that the resource allocator is configured to identify the first system resource which limits the execution performance of the computational workload. According to other embodiments, this task may be performed by another entity of the computing system. According to embodiments, the computing system may feature multiple partitions, each partition containing multiple resources under the control of one resource allocator of the computing system.

According to embodiments, the system resources are selected from the group comprising central processing unit (CPU) resources, graphic processing unit (GPU) resources, quantum processing unit (QPU) resources, field programmable gate array (FPGA) resources, special purpose accelerator resources, network resources, random access memory resources, non-volatile data storage resources, and database resources. This may have the advantage that the allocation of a wide range of system resources can be adjusted, depending on the requirements of the computational workload. Other types of system resources may be used, as well. CPU and GPU resources are compute resources which are chiefly required for compute-heavy tasks such as scientific computations, cryptographic and cryptocurrency calculations, and various types of data analysis and processing. QPUs make use of quantum effects for performing computations. Field programmable gate arrays are logic blocks with customizable functionality. They can therefore be programmed to perform specific tasks with a high degree of efficiency. Other types of special purpose accelerators may be used, as well. It may be beneficial to increase network resources for network-heavy tasks such as providing online services or if a network connection is congested. Many types of computational workloads benefit from increasing the amount of available random access memory. Tasks which handle a lot of data often benefit from increasing or upgrading non-volatile data storage resources. A non-volatile data storage resource is a data storage device which does not lose its state when it loses its power supply, such as a hard disk drive (HDD), a solid-state device (SDD), or a non-volatile memory (NVMe) drive. Finally, database-heavy tasks should be run with a sufficient amount of database resources. According to embodiments, adjusting the allocation of the aforementioned resources may be achieved by exchanging an allocation of an underlying component of the computing system. For instance, a different hard disk drive may be assigned to a client. According to further embodiments, adjusting an allocation of a resource may be achieved by increasing or decreasing an amount of a resource provided to a client. For instance, an amount of 1000 GB of storage may be assigned to a client, and an adjustment may involve allocating more storage space to the client. According to further embodiments, it is also possible that the adjustment involves changing other parameters such as a limit of the disk access speed, a network priority, and the like.

According to an embodiment, the identification method comprises the execution of at least one algorithm selected from the group comprising heuristic algorithms, machine learning algorithms, and algorithms for multivariate analysis. Such algorithms may allow to identify which resource should be changed in order to improve the execution performance of the computational workload. A heuristic algorithm is an algorithm which may provide a close-to-optimal solution to a given problem. Heuristic algorithms typically have the advantage of being easier to implement than exact algorithms, and of not necessarily finding the most optimal but rather adequate solutions in a quick manner. Machine-learning algorithms may make use of various machine-learning approaches. They are typically split into a learning or training phase and an application or inference phase. In the learning phase, a machine-learning algorithm may acquire information using real-world data. In the application phase, the machine-learning algorithm may apply this knowledge in order to identify a system resource which may be adjusted to improve the execution performance of the computational workload. The application of machine-learning algorithms may have the advantage of identifying bottlenecks with a very low error rate. Algorithms for multivariate analysis allow to estimate the effects of changing multiple parameters at the same time. Applying such an algorithm may be advantageous for determining the effects of adjusting an allocation of multiple system resources at the same time.

According to some embodiments, the method further comprises adjusting the identification method if the temporary adjustment of the allocation of the first system resource to the client does not improve the execution performance of the computational workload, applying by the computing system the adjusted identification method, the adjusted identification method identifying a second system resource of the system resources which limits an execution performance of the computational workload, performing a temporary adjustment of the allocation of the second system resource to the client, evaluating by the computing system whether the temporary adjustment of the allocation of the second system resource to the client improves the execution performance of the computational workload, transmitting by the computing system to the client a message indicating that the allocation of the second system resource to the client can be permanently adjusted if the temporary adjustment of the allocation of the second system resource to the client improves the execution performance of the computational workload, and, in case of receiving by the computing system from the client an instruction to perform a permanent adjustment of the allocation of the second system resource to the client, performing by the computing system the permanent adjustment of the allocation of the second system resource to the client. If the temporary adjustment of the allocation of the first system resource to the client is not successful, this may indicate that the identification method is faulty or inadequate for the situation at hand. The presented approach may have the advantage that the identification method can be changed in order to successfully identify a system resource which truly represents a bottleneck for executing the computational workload.

According to an embodiment, if the temporary adjustment of the second system resource to the client improves the execution of the computational workload, the computing system will not introduce a further identification method. According to another embodiment, the computing system may change the identification method again, repeating the process. According to some embodiments, the process is repeated multiple times until an identification method has been selected which can successfully identify a system resource that represents a bottleneck. According to an embodiment, the process may be repeated for a fixed amount of times. According to another embodiment, the process may be repeated until a fixed amount of time has elapsed.

According to further embodiments, identifying the first system resource may further comprise classifying by the computing system a type of computation that is being performed or a type of software that is being run during execution of the computational workload and consulting by the computing system a resource usage profile associated with the type of computation or the type of software, the resource usage profile specifying that the first system resource is likely to limit the execution performance. This may have the advantage that a bottleneck can be quickly and correctly identified by taking into account the type of computation being performed or the type of software that is being run. A certain type of computation will usually have a distinctive pattern of resource usage. The computing system may comprise a database or may have access to a database which identifies types of system resources that are used heavily when a certain type of computation is being executed or when a certain type of software is being used. This information may be employed by the identification method in order to establish that the first system resource should be adjusted. For instance, the computational workload may comprise running a scientific software. The identification method may then access the database, obtaining the information that this specific scientific software requires a large amount of RAM. The computing system may then temporarily adjust the amount of RAM assigned to the client and evaluate whether this changes the execution performance of the computational workload.

According to another embodiment, the temporary and/or permanent adjustment of the allocation of the first system resource to the client comprises increasing or decreasing a fraction of the first system resource allocated to the client. For instance, an amount of RAM allocated to the client may be increased. It should be noted that it may also be beneficial to decrease an amount of a resource allocated to a client. This may be useful for example to reduce the operating expenses or cost for the client without reducing performance. This can have the benefit of improved customer satisfaction, improving customer retention and thereby increasing revenue for the cloud service provider.

According to further embodiments, evaluating by the computing system whether the temporary adjustment of the allocation of the first system resource to the client improves the execution performance of the computational workload comprises quantifying a first execution performance of the computational workload before the temporary adjustment, quantifying a second execution performance of the computational workload during the temporary adjustment, and determining that the temporary adjustment improves the execution performance of the computational workload if the second execution performance surpasses the first execution performance. The computing system compares the execution performance before the temporary adjustment of the allocation to the execution performance while the temporary adjustment of the allocation is in effect. This may have the advantage that a quick comparison between execution performances with and without the adjustment can be obtained.

According to another embodiment, the method may further comprise quantifying a third execution performance of the computational workload after the temporary adjustment of the allocation of the first system resource to the client and determining that the temporary adjustment improves the execution performance of the computational workload if the second execution performance surpasses the third execution performance in addition to surpassing the first execution performance. Therefore, after the temporary adjustment has been reverted, the third execution performance is quantified. If the temporary adjustment is beneficial, the third execution performance will be inferior to the second execution performance. In some cases, comparing only the first execution performance to the second execution performance may yield inaccurate results. For instance, an improved execution performance while the temporary adjustment is in effect may be due to external factors which are not related to the temporary adjustment. It is also possible that the temporary adjustment of the first system resource brings about a change within the computational system which persists even after the temporary adjustment of the allocation of the first system resource to the client has been reverted. In this case, a permanent adjustment of the allocation of the first system resource to the client is not necessary. Therefore, this embodiment may have the advantage that it allows to determine in a more accurate manner whether a permanent adjustment of the allocation of the first system resource to the client would be beneficial.

According to another embodiment, the method further comprises including in the message to the client by the computing system data obtained by quantifying the first execution performance and the second execution performance in order to provide the client with a prognosis regarding a performance enhancement which can be obtained by performing the permanent adjustment of the allocation of the first system resource to the client. This may have the advantage that the client is thereby provided with information indicating the effects of adjusting the allocation of the first system resource to the client. According to embodiments, the message may also contain further information regarding the proposed adjustment, for instance the resource type of the first system resource (CPU, RAM, etc.), by which degree the first system resource is to be adjusted (e.g., amount of RAM added), or a time schedule detailing when and/or for how long the adjustment will be in effect.

According to other embodiments, the method may further comprise calculating by the computing system a difference between the first execution performance and the second execution performance and including the performance difference in the message to the client. According to an embodiment, a difference in execution times of the computational workload may be provided to the client. The client may then compare execution times and decide whether the allocation of the first system resource to the client should be permanently adjusted. This embodiment may have the advantage that it allows to quantify and communicate to the client an effect of adjusting the allocation of the first system resource to the client.

According to another embodiment, the method further comprises receiving by the computing system a first command from the client to execute a subtask of the computational workload and performing by the computing system the temporary adjustment of the allocation of the first system resource to the client while the subtask is being executed. According to embodiments, the subtask may be triggered by a command from the client to perform the subtask. According to this embodiment, the computing system temporarily adjusts the allocation of the first system resource to the client while the subtask is being executed. This may have the advantage that it allows for an immediate and quick comparison between the execution performance with and without the temporary adjustment with regard to a particular subtask.

According to other embodiments, the method further comprises receiving by the computing system a command from the client to execute a subtask of the computational workload and executing the subtask until completion, after the subtask has been completed, performing by the computing system the temporary adjustment of the allocation of the first system resource to the client, and re-executing the subtask of the computational workload with the temporary adjustment in effect. According to this embodiment, the temporary adjustment is in effect only while the subtask is being re-executed. This may have the advantage that the subtask is not disturbed by any adjustments during the first time that it is executed. According to embodiments, evaluating whether the temporary adjustment of the allocation of the first system resource to the client improves an execution performance of the computational workload may comprise comparing an execution performance during the execution of the subtask to an execution performance during the re-execution of the subtask. According to some embodiments, the subtask is aborted either when it is first executed or when it is re-executed. For instance, the re-execution of the subtask may be aborted when sufficient data for comparing the execution performance of the subtask with and without the adjustment has been collected.

According to another embodiment, the method further comprises receiving by the computing system a first command from the client to execute a first subtask of the computational workload and executing the first subtask until completion, after the first subtask has been completed, performing by the computing system the temporary adjustment of the allocation of the first system resource to the client, and receiving by the computing system a second command from the client to execute a second subtask of the computational workload and executing the second subtask of the computational workload. According to embodiments, evaluating whether the temporary adjustment of the allocation of the first system resource to the client improves an execution performance of the computational workload may comprise comparing an execution performance during the execution of the first subtask to an execution performance during the execution of the second subtask. According to this embodiment, the temporary adjustment is not performed while the first subtask is being executed. Instead, the computing system waits for the first subtask to complete. Only the second subtask is executed with the temporary adjustment in effect. This may have the advantage that a reallocation of resources does not have to be performed while a subtask is being executed, and that a subtask does not have to be re-executed in order to obtain comparison data.

According to further embodiments, the method may further comprise inserting by the computing system into the message to the client a price for performing the permanent adjustment of the allocation of the first computational resource to the client, and, in response to receiving the instruction from the client, if the instruction contains information specifying that the client agrees to the price, performing the permanent adjustment of the allocation of the first computational resource to the client. The message from the computing system to the client may therefore be an offer for adjusting the first resource. This may have the advantage that a price for permanently adjusting the allocation of the first system resource can be presented to the client. The client can then decide to the purchase the adjustment of the allocation of the first system resource. According to embodiments, the instruction to perform the permanent adjustment of the allocation of the first system resource to the client is a purchase order. According to some embodiments, the purchase order is linked to a financial transaction or contains a confirmation of a financial transaction.

According to some embodiments, the instruction from the client contains a bid and the method further comprises determining by the computing system that a temporary adjustment of an allocation of the first system resource to further clients improves an execution performance of further computational workloads on the further clients, transmitting by the computing system to the further clients messages indicating that the allocation of the first system resource to the further clients can be permanently adjusted, in response thereto, receiving by the computing system further instructions from the further clients to perform a permanent adjustment of the allocation of the first system resource to the further clients, the further instructions containing further bids; and in response to receiving the instruction and the further instructions, if the bid is higher than the further bids, performing by the computing system the permanent adjustment of the allocation of the first system resource to the client. Therefore, a method is provided which allows multiple clients to place a bid for a certain system resource. This may have the advantage that an adequate market price for the provision of a system resource can be determined. For instance, in a partition of a cloud computing system with a limited amount of RAM resources, the computing system may send a message to the first client and to multiple further clients, the message indicating that an increase of RAM resources by one gigabyte will improve an execution performance of respective workloads of the clients. Each of the clients may then place a bid. If the first client places the highest bid, the amount of RAM allocated to the first client is increased by one gigabyte. If one of the further clients places a higher bid than the first client, this amount of RAM is assigned to that further client.

According to an embodiment, the computational workload is executed on a virtual machine of the computing system. A virtual machine allows the computing system to run an operating system in an encapsulated manner A computing system may feature multiple virtual machines, and multiple virtual machines may be run on just one processor. This may have the advantage that virtual machines allow to use hardware resources more efficiently and to separate applications, user spaces and operating systems of different clients. Resource usage and distribution can be adjusted more easily. According to embodiments, the computing system features a virtual machine which allows to adjust an allocation of resources to the client. For instance, a virtual machine may allow to adjust how much RAM the virtual machine is allowed to use when executing the computational workload of the client.

According to an embodiment, the computational workload can be executed in a Linux container on a computing device of the computing system. A Linux container allows the computing system to run processes in an encapsulated manner A computing system may feature multiple Linux containers, and multiple Linux containers may be run on just one processor. This may have the advantage that Linux containers allow to use hardware resources more efficiently and to separate applications, user spaces and operating systems of different clients. Resource usage and distribution can be adjusted more easily. According to embodiments, the computing system features a Linux container which allows to adjust an allocation of resources to the client. For instance, a Linux container may allow to adjust how much RAM the Linux container is allowed to use when executing the computational workload of the client.

According to embodiments, the system resources of the computing system are distributed over multiple networked computing devices. This may have the advantage that resources can be easily shared within the computing system. The system resources of the computing system may be distributed over multiple networked computing devices within a local network. According to another embodiment, the system resources may be distributed over computing devices connected to the world wide web. The computing devices may be ordinary computers, web servers, database servers, or computing devices of other types. According to an embodiment, the computing devices are connected over a network to system resources of the computing system. In some embodiments, computing devices of the computing system may be dedicated to providing resources of a certain type. For instance, a computing device may be dedicated to providing additional computational power via accelerators such as GPUs, QPUs, or FPGAs, and may therefore be equipped with multiple accelerators or accelerators of different performance. Another computing device may be dedicated to providing persistent storage on storage devices such as HDDs, SSDs, NVMes, or other storage devices, and may feature arrays of individual storage devices. Because the computing devices are networked within the computing system, resources may be allocated quickly to a computational workload that requires these resources.

According to another embodiment, the computing system provides infrastructure as a service in a cloud computing environment by executing the computational workload. This may have the advantage that infrastructure can be provided on-demand in a convenient manner. The term cloud computing refers to a type of computing infrastructure which allows to provide computational resources on demand According to embodiments, the computing system may execute workloads in a cloud environment on demand According to embodiments, the computing system may comprise a service gateway which allows to access the cloud services provided by the computing system. According to an embodiment, the service gateway is a web server. According to embodiments, the computing system features a resource allocator. The resource allocator may be a computing device which allows to allocate resources within the computing system. According to an embodiment, the resource allocator also provides scheduling capabilities for scheduling resources within the cloud. According to another embodiment, the resource allocator comprises a mechanism for identifying a first system resource of the system resources which limits an execution performance of the computational workload.

The invention also relates to a computing system, the computing system being configured to receive at least one command to execute a computational workload from a client, to allocate system resources of the computing system to the client and to execute the computational workload, to apply an identification method, the identification method identifying a first system resource of the system resources which limits an execution performance of the computational workload, to perform a temporary adjustment of an allocation of the first system resource to the client, to evaluate whether the temporary adjustment of the allocation of the first system resource to the client improves an execution performance of the computational workload, to transmit to the client a message indicating that the allocation of the first system resource to the client can be permanently adjusted if the temporary adjustment of the allocation of the first system resource to the client improves the execution performance of the computational workload, and, in case of receiving from the client an instruction to perform a permanent adjustment of the allocation of the first system resource to the client, to perform the permanent adjustment of the allocation of the first system resource to the client. Embodiments of the computing system can perform variations of the method described above in arbitrary combinations.

The invention also relates to a computer program product for operating a computing system, the computer program product comprising a computer readable storage medium having program instructions embodied therewith, the program instructions executable by a processor to cause the physical computing system to receive at least one command to execute a computational workload from a client, to allocate system resources of the computing system to the client and to execute the computational workload, to apply an identification method, the identification method identifying a first system resource of the system resources which limits an execution performance of the computational workload, to perform a temporary adjustment of an allocation of the first system resource to the client, to evaluate whether the temporary adjustment of the allocation of the first system resource to the client improves an execution performance of the computational workload, to transmit to the client a message indicating that the allocation of the first system resource to the client can be permanently adjusted if the temporary adjustment of the allocation of the first system resource to the client improves the execution performance of the computational workload, and, in case of receiving from the client an instruction to perform a permanent adjustment of the allocation of the first system resource to the client, to perform the permanent adjustment of the allocation of the first system resource to the client. Embodiments of the computer program product can cause a computing system to perform variations of the method described above in arbitrary combinations.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities such as server time and network storage, as needed, on demand and automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
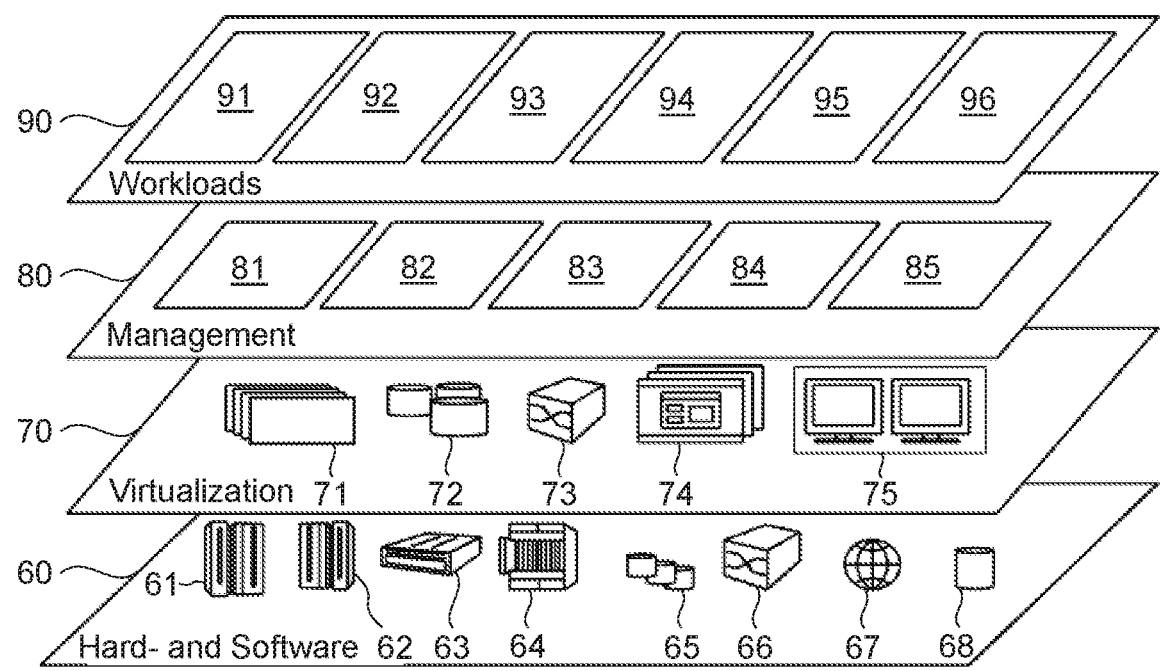
FIG. 2 depicts a set of functional abstraction layers provided by the cloud computing environment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. According to the present invention, this may involve receiving at least one command to execute a computational workload from a client, allocating system resources to the client and executing the computational workload, applying an identification method, the identification method identifying a first system resource of the system resources which limits an execution performance of the computational workload, performing a temporary adjustment of an allocation of the first system resource to the client, evaluating whether the temporary adjustment of the allocation of the first system resource to the client improves an execution performance of the computational workload, transmitting to the client a message indicating that the allocation of the first system resource to the client can be permanently adjusted if the temporary adjustment of the allocation of the first system resource to the client improves the execution performance of the computational workload, and, in case of receiving from the client an instruction to perform a permanent adjustment of the allocation of the first system resource to the client, performing the permanent adjustment of the allocation of the first system resource to the client. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 3:
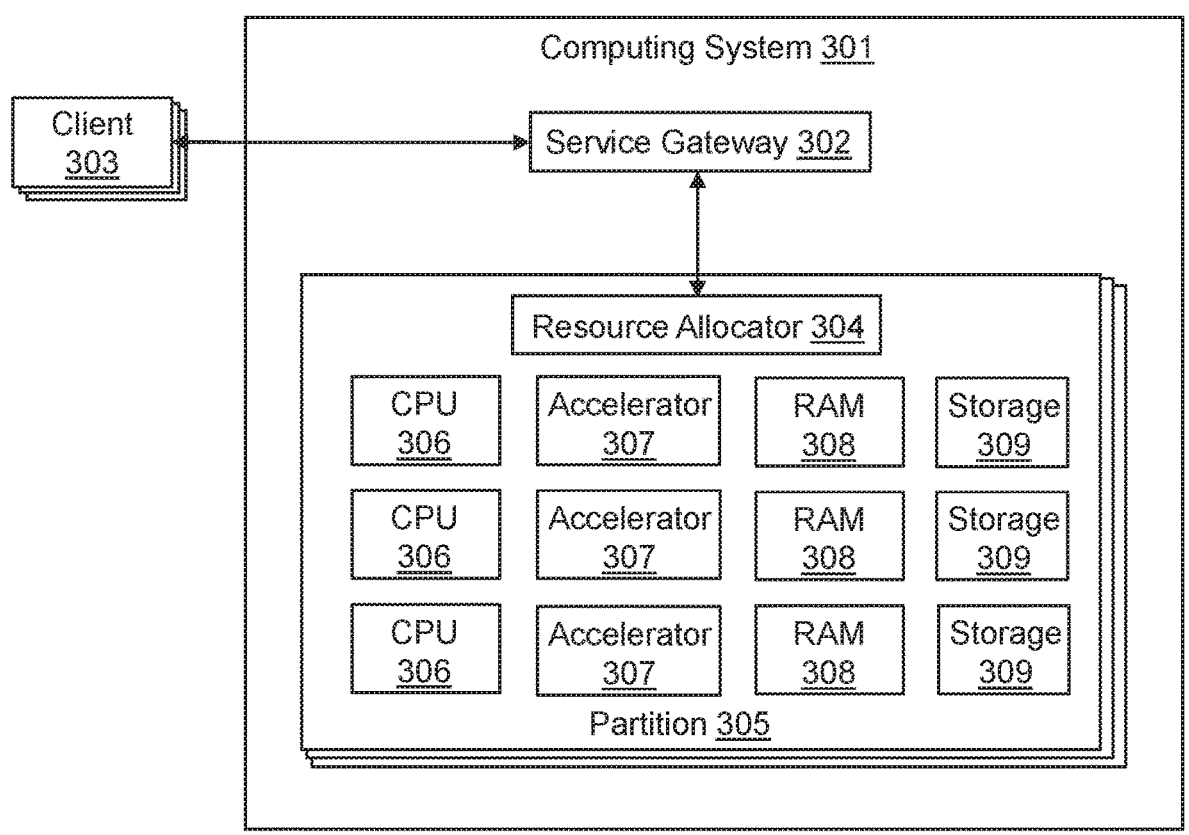
FIG. 3 depicts a block diagram of a computing system.

FIG. 3 depicts a block diagram of a computing system 301. The computing system 301 may be a cloud computing system according to some examples. The computing system 301 features multiple networked computing devices. According to the present example, one computing device of the computing system 301 is a service gateway 302. The service gateway 302 may be a web server or another computing device which allows the computing system 301 to communicate with external entities. The service gateway 302 may be accessed by a client 303. The client 303 may use the computing system 301 for performing a computational workload. For instance, the client 303 may send a request for system resources to the service gateway 302. The service gateway 302 may then communicate with a resource allocator 304 contained within a partition 305 of the computing system 301. The partition 305 contains a group of resources which may be used to execute the computational workload within the computing system 301. Upon receiving the request for system resources, the resource allocator 304 allocates system resources to the client 303 as requested. During the execution of the computational workload, the resource allocator 304 may be used to temporally or permanently change the allocation of system resources to the client 303. According to some examples, the resource allocator 304 may be configured to identify a system resource of the system resources which limits an execution performance of the computational workload. The partition 305 according to the present example contains three CPUs 306, three accelerators 307, which may for example be GPUs, FPGAs or QPUs, three RAM units 308, and three data storage devices 309, which may for example be HDDs or SDDs. Other partitions 305 of the computing system 301 may contain resources in other combinations. Multiple clients 303 may use the computing system 301 for executing computational workloads.

Figure 4:
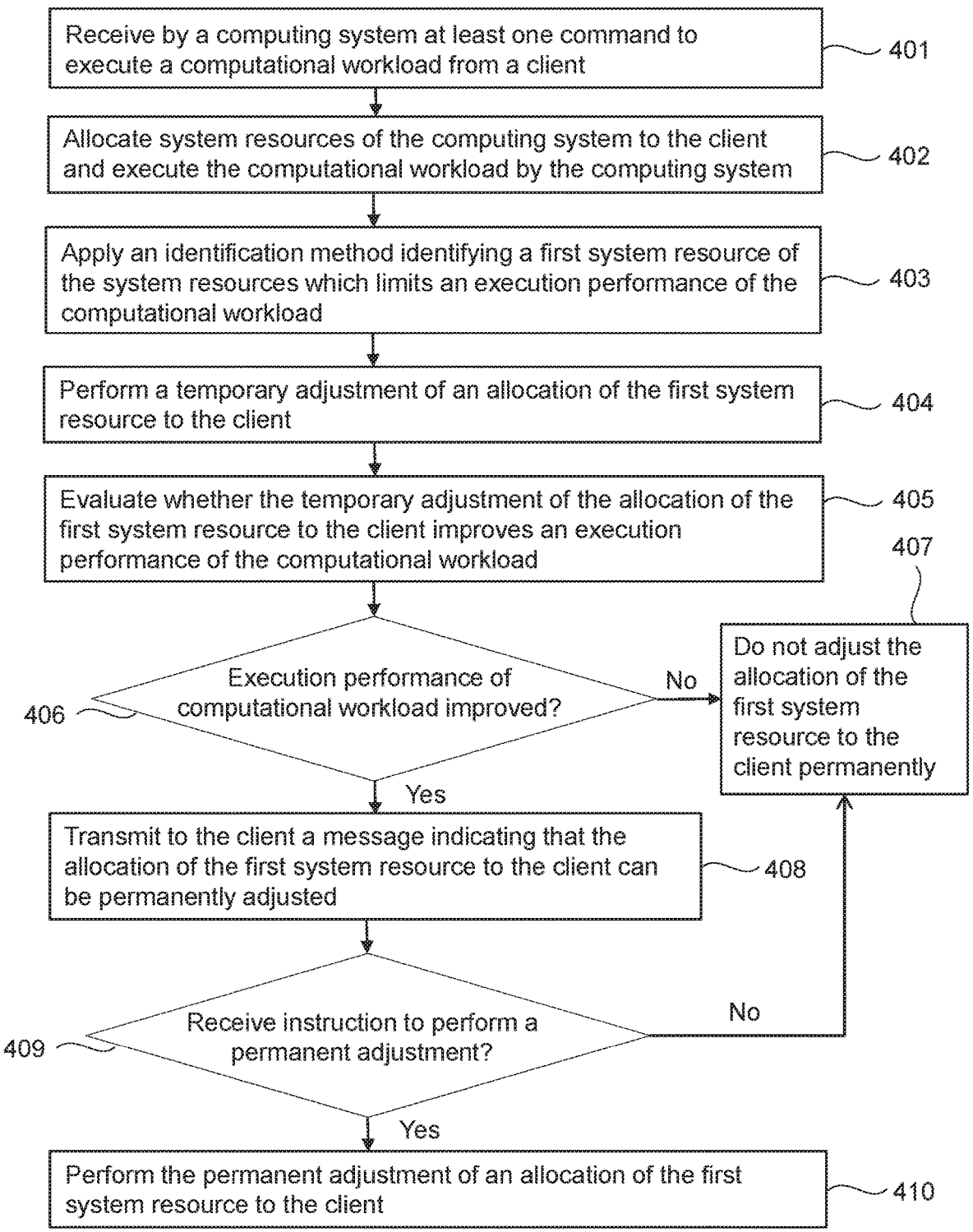
FIG. 4 depicts a flowchart detailing how the computing system may adjust its performance.

FIG. 4 depicts a flowchart detailing how the computing system may function. The computing system receives at least one command to execute a computation workload from a client (401). The computing system then allocates system resources of the computing system to the client and executes the computational workload (402). According to the present example, the computing system applies an identification method that identifies a first system resource of the system resources which limits an execution performance of the computational workload (403). This may be achieved by various means, for instance by means of a heuristic algorithm, by means of a machine learning algorithm, or by means of an algorithm for multivariate analysis. According to some examples, more than one system resource may be identified which limits the execution performance of the computational workload.

The computing system may then perform a temporary adjustment of an allocation of the first system resource to the client (404). This may imply that a CPU allocated to the client is exchanged for another CPU, or that a storage device allocated to the client is exchanged for another storage device. According to other instances, this may mean that more or less RAM is assigned to the client, or that a network bandwidth available for executing the computational workload is increased or decreased. Following this, the computing system evaluates whether the temporary adjustment of the allocation of first system resource to the client improves an execution performance of the computational workload (405). The result of the evaluation is the basis of a subsequent decision (406). If the execution performance is not improved, then the allocation of the first system resource to the client is not made permanent (407). If the execution performance has improved, then the computing system may transmit to the client a message that the allocation of the first system resource to the client can be permanently adjusted (408). The message may contain an offer which declares a price for the permanent adjustment and which details performance improvements which are to be expected with respect to the proposed adjustment of the allocation of the first system resource.

If the computing system receives an instruction to perform a permanent adjustment of the first system resource (409), then the computing system performs a permanent adjustment of the first system resource to the client (410). If the computing system receives no such message, then the allocation of the first system resource to the client is not adjusted permanently (407).

Figure 5:
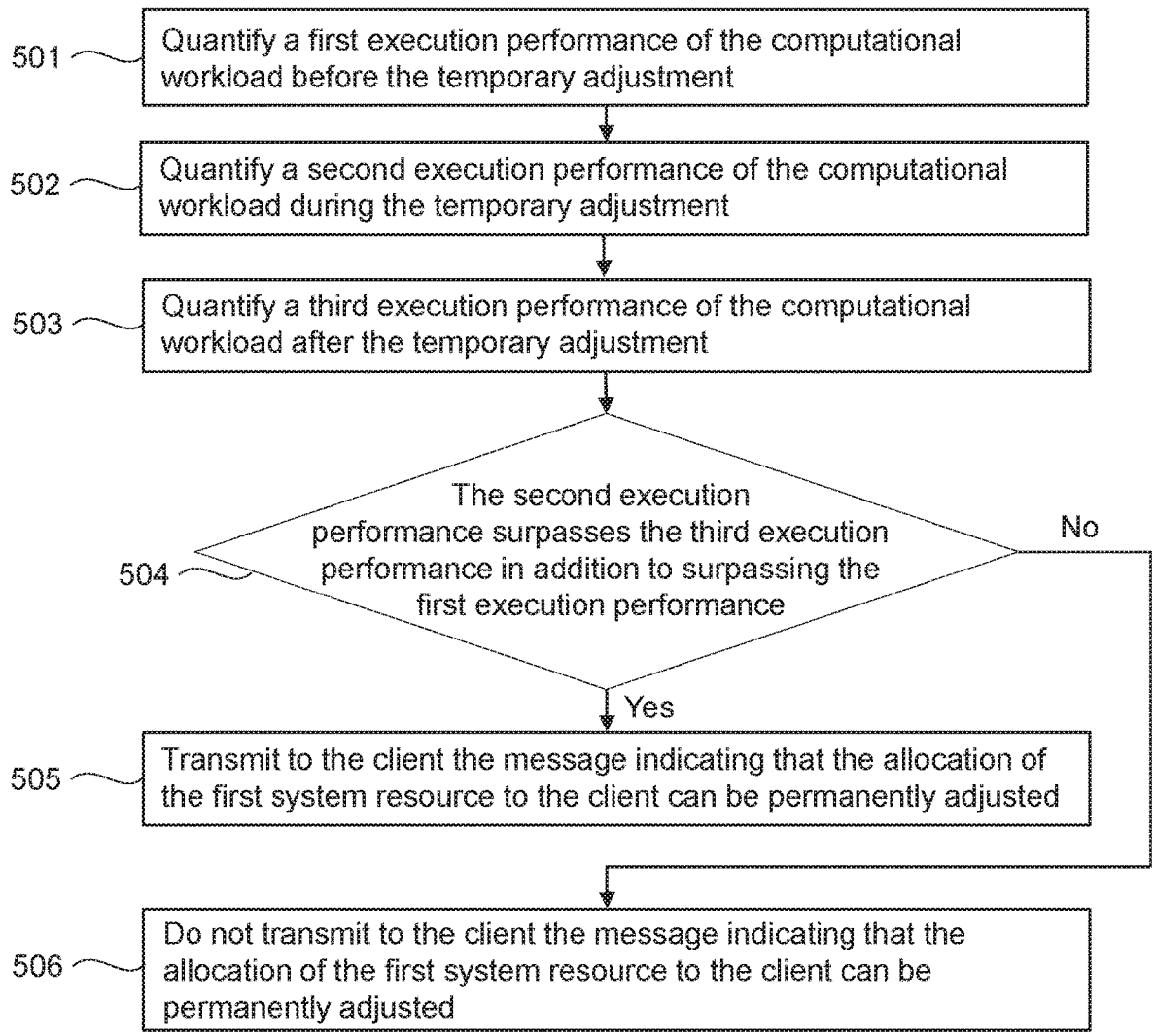
FIG. 5 depicts a flowchart detailing an example of how the computing system may determine that a temporary adjustment of an allocation of a first system resource to a client improves an execution performance of a computational workload.

FIG. 5 depicts a flowchart detailing an example of how the computing system may determine that the temporary adjustment of the allocation of the first system resource to the client improves the execution performance of the computational workload. The computing system quantifies a first execution performance of the computational workload before the temporary adjustment (501). The computing system may also quantify a second execution performance of the computational workload during the temporary adjustment (502). According to this example, the computing system additionally quantifies a third execution performance of the computational workload after the temporary adjustment (503). The computing system then evaluates whether the second execution performance surpasses the third execution performance in addition to surpassing the first execution performance (504). If this is the case, then the computing system may transmit to the client the message indicating that the allocation of the first system resource to the client can be permanently adjusted (505). If the second execution performance does not surpass both the first and the third execution performance, then this implies that the execution performance before or after the temporal adjustment of the allocation of the first system resource to the client is better than the execution performance while the allocation of the first system resource is temporarily adjusted. In this case, the computing system does not transmit to the client the message that the allocation of the first system resource to the client can be permanently adjusted (506).

Figure 6:
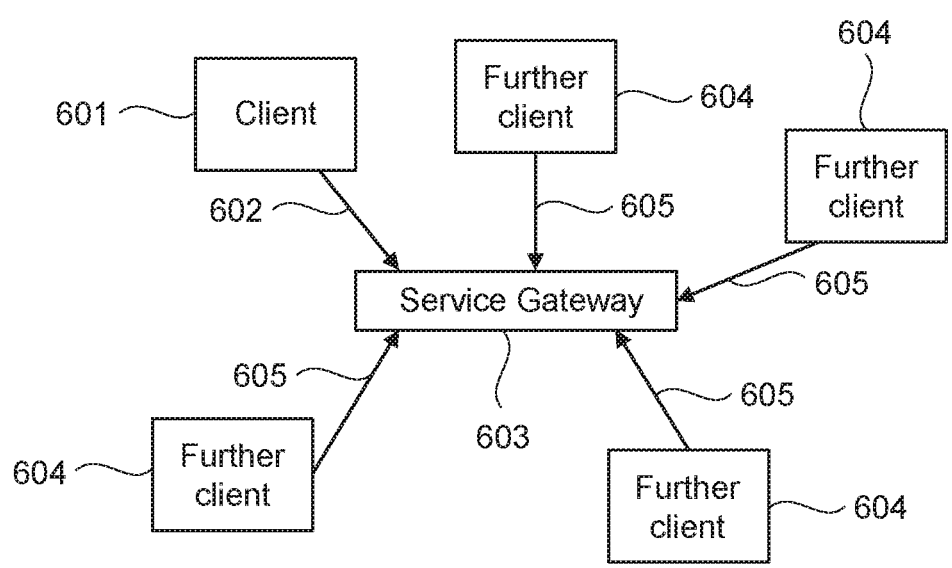
FIG. 6 depicts a block diagram of a client and further clients which compete in an auction for system resources of the computing system.

FIG. 6 depicts a block diagram of a client 601 and further clients 604 which compete in an auction for system resources of the computing system. After having received a message from the computing system that an allocation of system resources to the client 601 may be adjusted, the client 601 may send a bid 602 to a service gateway 603 of the computing system. Further clients 604 are informed by the computing system that an allocation of system resources to the further clients 604 may improve the execution performance of respective computational workloads of the further clients. The further clients may place further bids 605. In this scenario, the client 601 and the further clients 604 participate in an auction for a limited resource of the computing system. For instance, the client 601 and the further clients 604 may all want to make use of a certain CPU of the computing system. The service gateway 603 of the computing system receives the bid 602 from the client 601 and the further bids 605 from the further clients 604. According to this example, the client 601 or the further client 604 which has placed the highest bid wins the auction and can make use of said CPU of the computing system.

What is claimed is:
1. A method for adjusting performance of a computing system, the method comprising:
    receiving by the computing system at least one command to execute a computational workload from a client;
    allocating system resources of the computing system to the client by the computing system and executing the computational workload by the computing system;
    applying by the computing system an identification method, the identification method identifying a first system resource of the system resources which limits an execution performance of the computational workload, wherein the identification method comprises accessing a database that provides information on resource requirements associated with the computational workload;

performing by the computing system a temporary adjustment of an allocation of the first system resource to the client;

evaluating by the computing system whether the temporary adjustment of the allocation of the first system resource to the client improves an execution performance of the computational workload;

if the temporary adjustment of the allocation of the first system resource to the client improves the execution performance of the computational workload, transmitting by the computing system to the client a message indicating that the allocation of the first system resource to the client can be permanently adjusted;

in case of receiving by the computing system from the client an instruction to perform a permanent adjustment of the allocation of the first system resource to the client, performing by the computing system the permanent adjustment of the allocation of the first system resource to the client;

receiving by the computing system a first command from the client to execute a subtask of the computational workload; and performing by the computing system the temporary adjustment of the allocation of the first system resource to the client while the subtask is being executed.

2. The method according to claim 1, the system resources being selected from the group comprising central processing unit (CPU) resources, graphic processing unit (GPU) resources, field programmable gate array (FPGA) resources, special purpose accelerator resources, network resources, random access memory resources, non-volatile data storage resources and database resources.

3. The method according to claim 1, the identification method comprising execution of at least one algorithm selected from the group comprising heuristic algorithms, machine learning algorithms, and algorithms for multivariate analysis.

4. The method according to claim 1, further comprising:
if the temporary adjustment of the allocation of the first system resource to the client does not improve the execution performance of the computational workload, adjusting the identification method;

applying by the computing system the adjusted identification method, the adjusted identification method identifying a second system resource of the system resources which limits an execution performance of the computational workload;

performing a temporary adjustment of the allocation of the second system resource to the client;

evaluating by the computing system whether the temporary adjustment of the allocation of the second system resource to the client improves the execution performance of the computational workload;

if the temporary adjustment of the allocation of the second system resource to the client improves the execution performance of the computational workload, transmitting by the computing system to the client a message indicating that the allocation of the second system resource to the client can be permanently adjusted; and in case of receiving by the computing system from the client an instruction to perform a permanent adjustment of the allocation of the second system resource to the client, performing by the computing system the permanent adjustment of the allocation of the second system resource to the client.

5. The method according to claim 1, wherein identifying the first system resource comprises:
classifying by the computing system a type of computation that is being performed or a type of software that is being run during execution of the computational workload; and consulting by the computing system a resource usage profile associated with the type of computation or the type of software, the resource usage profile specifying that the first system resource will limit the execution performance.

6. The method according to claim 1, wherein the temporary and/or permanent adjustment of the allocation of the first system resource to the client comprises increasing or decreasing a fraction of the first system resource allocated to the client.

7. The method according to claim 1, wherein evaluating by the computing system whether the temporary adjustment of the allocation of the first system resource to the client improves the execution performance of the computational workload comprises:
quantifying a first execution performance of the computational workload before the temporary adjustment;

quantifying a second execution performance of the computational workload during the temporary adjustment; and if the second execution performance surpasses the first execution performance, determining that the temporary adjustment improves the execution performance of the computational workload.

8. The method according to claim 7, further comprising:
quantifying a third execution performance of the computational workload after the temporary adjustment of the allocation of the first system resource to the client; and if the second execution performance surpasses the third execution performance in addition to surpassing the first execution performance, determining that the temporary adjustment improves the execution performance of the computational workload.

9. The method according to claim 1, further comprising:
including in the message to the client by the computing system data obtained by quantifying a first execution performance and a second execution performance, in order to provide the client with a prognosis regarding a performance enhancement which can be obtained by performing the permanent adjustment of the allocation of the first system resource to the client.

10. The method according to claim 9, further comprising:
calculating by the computing system a performance difference between the first execution performance and the second execution performance and including the performance difference in the message to the client.

11. The method according to claim 1, further comprising:
receiving by the computing system a command from the client to execute a subtask of the computational workload and executing the subtask until completion;

after the subtask has been completed, performing by the computing system the temporary adjustment of the allocation of the first system resource to the client; and re-executing the subtask of the computational workload with the temporary adjustment in effect.

12. The method according to claim 1, further comprising:
receiving by the computing system a first command from the client to execute a first subtask of the computational workload and executing the first subtask until completion;
after the first subtask has been completed, performing by the computing system the temporary adjustment of the allocation of the first system resource to the client; and
receiving by the computing system a second command from the client to execute a second subtask of the computational workload and executing the second subtask of the computational workload.

13. The method according to claim 1, further comprising:
inserting by the computing system into the message to the client a price for performing the permanent adjustment of the allocation of the first system resource to the client; and
in response to receiving the instruction from the client, if the instruction contains information specifying that the client agrees to the price, performing the permanent adjustment of the allocation of the first system resource to the client.

14. The method according to claim 1, the instruction from the client containing a bid and the method further comprising:
determining by the computing system that a temporary adjustment of an allocation of the first system resource to further clients improves an execution performance of further computational workloads on the further clients;
transmitting by the computing system to the further clients, messages indicating that the allocation of the first system resource to the further clients can be permanently adjusted;
in response thereto, receiving by the computing system further instructions from the further clients to perform a permanent adjustment of the allocation of the first system resource to the further clients, the further instructions containing further bids; and
in response to receiving the instruction and the further instructions, if the bid is higher than the further bids, performing by the computing system the permanent adjustment of the allocation of the first system resource to the client.

15. The method according to claim 1, the computational workload being executed on a virtual machine of the computing system.

16. The method according to claim 1, the system resources of the computing system being distributed over multiple networked computing devices.

17. The method according to claim 1, wherein the computing system provides infrastructure as a service in a cloud computing environment by executing the computational workload.

18. A computer system, the computer system comprising:
one or more computer processors;
one or more computer readable storage media; and
program instructions stored on the one or more computer readable storage media for execution by at least one of the one or more processors, the program instructions comprising:
program instructions to receive at least one command to execute a computational workload from a client;
program instructions to allocate system resources of the computing system to the client and to execute the computational workload;
program instructions to apply an identification method, the identification method identifying a first system resource of the system resources which limits an execution performance of the computational workload, wherein the identification method comprises accessing a database that provides information on resource requirements associated with the computational workload;
program instructions to perform a temporary adjustment of an allocation of the first system resource to the client;
program instructions to evaluate whether the temporary adjustment of the allocation of the first system resource to the client improves an execution performance of the computational workload;
if the temporary adjustment of the allocation of the first system resource to the client improves the execution performance of the computational workload, program instructions to transmit to the client a message indicating that the allocation of the first system resource to the client can be permanently adjusted;
in case of receiving from the client an instruction to perform a permanent adjustment of the allocation of the first system resource to the client, program instructions to perform the permanent adjustment of the allocation of the first system resource to the client;
program instructions to receive a first command from the client to execute a subtask of the computational workload; and
program instructions to perform the temporary adjustment of the allocation of the first system resource to the client while the subtask is being executed.

19. A computer program product for operating a computing system, the computer program product comprising a computer readable storage medium having program instructions embodied therewith, the program instructions executable by a processor to cause the computing system to:
receive at least one command to execute a computational workload from a client;
allocate system resources of the computing system to the client and execute the computational workload;
apply an identification method, the identification method identifying a first system resource of the system resources which limits an execution performance of the computational workload, wherein the identification method comprises accessing a database that provides information on resource requirements associated with the computational workload;
perform a temporary adjustment of an allocation of the first system resource to the client;
evaluate whether the temporary adjustment of the allocation of the first system resource to the client improves an execution performance of the computational workload;
if the temporary adjustment of the allocation of the first system resource to the client improves the execution performance of the computational workload, transmit to the client a message indicating that the allocation of the first system resource to the client can be permanently adjusted;
in case of receiving from the client an instruction to perform a permanent adjustment of the allocation of the first system resource to the client, perform the permanent adjustment of the allocation of the first system resource to the client;
receive a first command from the client to execute a subtask of the computational workload; and
perform the temporary adjustment of the allocation of the first system resource to the client while the subtask is being executed.

* * * * *